United States Patent
Shibasaki (10) Patent No.: US 11,907,113 B2
(45) Date of Patent: Feb. 20, 2024

(54) MAGNETIC DISK DEVICE AND CONTROL METHOD OF MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takeshi Shibasaki, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 14 days.

(21) Appl. No.: 17/817,463

(22) Filed: Aug. 4, 2022

(65) Prior Publication Data
US 2023/0244597 A1    Aug. 3, 2023

(30) Foreign Application Priority Data
Jan. 31, 2022   (JP) ................................. 2022-013046

(51) Int. Cl.
 *G06F 12/02*    (2006.01)
 *G11B 5/012*    (2006.01)
(52) U.S. Cl.
 CPC ............ *G06F 12/023* (2013.01); *G11B 5/012* (2013.01); *G06F 2212/7201* (2013.01)
(58) Field of Classification Search
 CPC ...................... G06F 12/023; G06F 2212/7201; G11B 5/012
 See application file for complete search history.

(56) References Cited

U.S. PATENT DOCUMENTS

| | | | | |
|---|---|---|---|---|
| 5,584,012 A * | 12/1996 | Kojima | ................ | G06F 3/0689 711/E12.04 |
| 5,805,932 A * | 9/1998 | Kawashima | ........ | H03M 7/3088 711/111 |
| 6,223,303 B1 * | 4/2001 | Billings | ............. | G11B 20/1883 |
| 6,501,905 B1 * | 12/2002 | Kimura | ............... | G06F 16/9027 711/170 |
| 7,804,661 B2 * | 9/2010 | Wilcox | ................ | G11B 5/5552 360/75 |
| 9,251,823 B1 * | 2/2016 | Liu | ....................... | G11B 5/5547 |
| 9,947,353 B1 * | 4/2018 | Zhang | ................... | G11B 5/5552 |
| 2006/0218211 A1 * | 9/2006 | Shikama | ............ | G11B 20/1883 |
| 2009/0195917 A1 * | 8/2009 | Aso | ...................... | G11B 5/59633 |
| 2017/0098463 A1 * | 4/2017 | Kawai | ................ | G11B 20/1889 |

* cited by examiner

*Primary Examiner* — William E. Baughman
(74) *Attorney, Agent, or Firm* — Knobbe, Martens, Olson & Bear, LLP (57) ABSTRACT

According to one embodiment, a magnetic disk device comprises magnetic disks, heads, and a controller. The controller does not allocate logical addresses to sectors of a first area to be specified in such a manner as to correspond to a defect existing in a predetermined recording area, the first area being within the predetermined recording area constituted of a plurality of cylinders adjacent to each other in the magnetic disks, and uniquely allocates logical addresses to sectors of a second area other than the first area. The controller makes allocation of logical addresses to the sectors of the second area different from each other according to the number of defects existing in the predetermined recording area.

11 Claims, 6 Drawing Sheets

MAGNETIC DISK DEVICE AND CONTROL METHOD OF MAGNETIC DISK DEVICE

CROSS-REFERENCE TO RELATED APPLICATIONS

This application is based upon and claims the benefit of priority from Japanese Patent Application No. 2022-013046, filed Jan. 31, 2022, the entire contents of which are incorporated herein by reference.

FIELD

Embodiments described herein relate generally to a magnetic disk device and control method of the magnetic disk device.

BACKGROUND

On a surface (recording surface) of a disk mounted on a magnetic device, defects such as a minute flaw, minute bump and the like including a spatter flake or the like exist. These defects become a factor causing a hindrance to normal write/read of data to/from the disk and also become a factor causing damage to the head. For this reason, in the magnetic disk device, locations of the defects are registered in advance as defect information. Areas registered as areas in which defects exist are excluded from the recording area of the disk by, for example, allocating no logical addresses to these areas.

In the magnetic disk device, with an improvement in the recording density, there is a need to lessen the gap between each of the reproducing head (reader) and recording head (writer), and magnetic disk. For this reason, a magnetic disk device in which a heater is provided in the vicinity of each of the reader and writer is known. The heaters heat the reader and writer to thereby protrude the reader and writer outwardly toward the surface side of the disk. Thereby, a margin for the read/write characteristics of the head is secured.

For example, when the head needs to straddle a bump of the disk at the time of a seek to an objective track, the reader and writer are cooled and, after waiting for the termination of the protrusion, the seek is started. Then, after the head completely straddles the bump, the heater is energized, whereby control of protruding the reader and writer is carried out. Thereby, a collision between the reader or writer and bump is avoided.

On the other hand, a predetermined waiting time is required before and after the head straddles the bump. Accordingly, the greater the number of the defects such as the bump and the like, the longer the waiting time becomes correspondingly, and it becomes necessary to spend a lot of time for data read processing and data write processing. Accordingly, it is required that deterioration in data read performance or data write performance, e.g., sequential performance resulting from the aforementioned defects be suppressed.

An embodiment described herein aims to provide a magnetic disk device and control method of the magnetic disk capable of avoiding, even when defects such as a bump and the like exist on the disk, a collision with the bump and the like, and suppressing deterioration in the sequential performance at the time of read and at the time of write of data.

DETAILED DESCRIPTION

In general, according to one embodiment, a magnetic disk device comprises magnetic disks, heads, and a controller. Each of the heads writes data to the magnetic disk and reads data from the magnetic disk. The controller does not allocate logical addresses to sectors of a first area to be specified in such a manner as to correspond to a defect existing in a predetermined recording area, the first area being within the predetermined recording area constituted of a plurality of cylinders adjacent to each other in the magnetic disks, and uniquely allocates logical addresses to sectors of a second area other than the first area. The controller makes allocation of logical addresses to the sectors of the second area different from each other according to the number of defects existing in the predetermined recording area.

Hereinafter, a magnetic disk device according to an embodiment will be described with reference to FIGS. 1 to 6.

Figure 1:
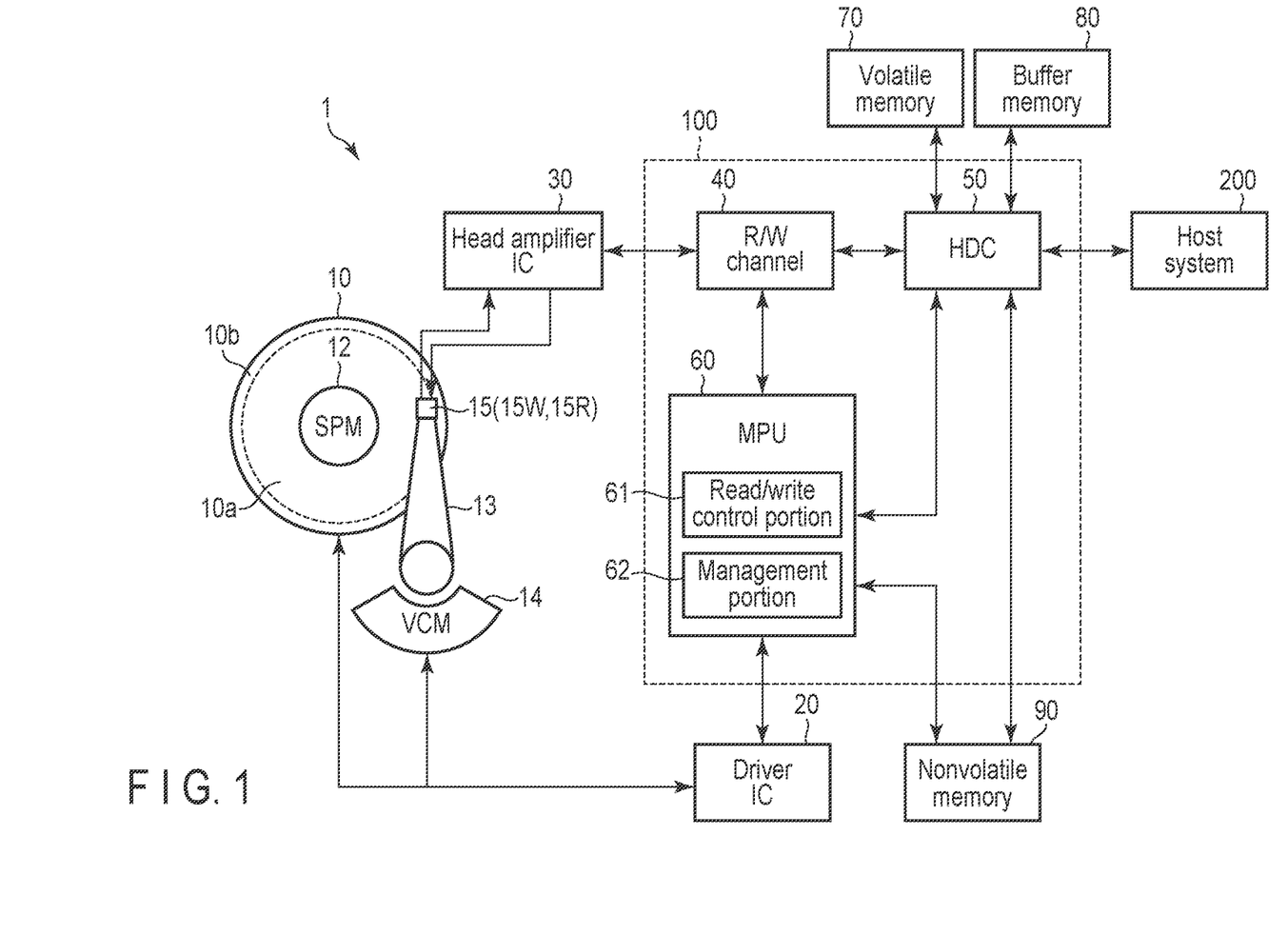
FIG. 1 is a block diagram showing the schematic configuration of a magnetic disk device according to an embodiment.

FIG. 1 is a block diagram showing the schematic configuration of the magnetic disk device 1 according to the embodiment. As shown in FIG. 1, the magnetic disk device 1 includes a head disk assembly (HDA) to be described later, driver IC 20, head amplifier integrated circuit (hereinafter referred to as a head amplifier IC) 30, volatile memory 70, buffer memory (buffer) 80, nonvolatile memory 90, and system controller 100. Further, the magnetic disk device 1 is connected to a host system (hereinafter simply referred to as a host) 200.

The HDA includes a magnetic disk (hereinafter referred to as a disk) 10, spindle motor (hereinafter referred to as an SPM) 12, arm 13 on which heads 15 are mounted, and voice coil motor (hereinafter referred to as a VCM) 14. The disk 10 is attached to the SPM 12 and is rotated by the drive of the SPM 12. The arm 13 and VCM 14 constitute an actuator. The actuator controls a seek of the head 15 mounted on the arm 13 to a target position on the disk 10 by the drive of the VCM 14. The number of the disk 10 or head 15 is not limited to one, and may be plural.

The disk 10 includes a user data area 10a usable by the user, and system area 10b to which information necessary for system management is written. The user data area 10a and system area 10b are each allocated to data-writable areas on the disk 10. Hereinafter, a direction parallel to the disk 10 and orthogonal to the radial direction of the disk 10 is called a circumferential direction.

The head 15 is configured in such a manner that a slider forms a main body thereof, and includes a write head 15W and read head 15R both of which are implemented in the slider. The write head 15W writes data on the disk 10. The read head 15R reads data recorded on the data track on the disk 10.

The driver IC 20 controls the drive of the SPM 12 and VCM 14 according to the control of the system controller 100 (more specifically, MPU 60 to be described later).

The head amplifier IC 30 includes a read amplifier and write driver. The read amplifier amplifies a read signal read from the disk 10 and outputs the amplified read signal to the system controller 100 (more specifically, read/write (R/W) channel 40 to be described later). The write driver outputs a write current corresponding to a signal output from the R/W channel 40 to the head 15.

The volatile memory 70 is a semiconductor memory in which stored data is lost when the power supply to the memory 70 is shut off. The volatile memory 70 stores therein data or the like necessary for each portion of the magnetic disk device 1. The volatile memory 70 is, for example, a dynamic random access memory (DRAM) or synchronous dynamic random access memory (SDRAM).

The buffer memory 80 is a semiconductor memory configured to temporarily record therein data or the like to be transmitted or received between the magnetic disk device 1 and host 200. It should be noted that the buffer memory 80 may be configured integral with the volatile memory 70. The buffer memory 80 is, for example, a DRAM, static random access memory (SRAM), SDRAM, ferroelectric random access memory (FeRAM), magneto-resistive random access memory (MRAM) or the like.

The nonvolatile memory 90 is a semiconductor memory which continues to retain data stored therein even when the power supply to the memory 90 is shut off. The nonvolatile memory 90 is, for example, a NOR-type or NAND-type flash read only memory (ROM) (FROM).

In the nonvolatile memory 90, defect information (hereinafter referred to as Plist) is stored. The Plist is an aggregate of information items indicating locations of defects existing on the surface (recording surface) of the disk 10. Presence/absence of a defect is detected in, for example, the quality inspection of the disk 10 before shipment of the product (magnetic disk device 1). In the Plist, for example, information items about a cylinder position, track position, sector position, sector length, head position, and the like at which or by which a defect exists are registered so as to be associated with each other. Each of the cylinder position, track position, and sector position is, for example, a position (physical address) of each of the cylinder, track, and sector on each disk 10 at which the corresponding defects exist. The sector number is the number of sectors in which the corresponding defects exist. The head position is, for example, a position (head number) of the head 15 carrying out read/write of data from/to the disk 10 on which the corresponding defect exists, and specifies the recording surface of the disk 10 on which the defect concerned exists.

In the Plist, not only the sector in which a defect actually exist, but also sectors (adjacent sectors) of a predetermined number adjacent to the aforementioned sector are also registered as a margin. The adjacent sector is a sector from which no existence of a defect is detected, and in which a defect smaller than the aforementioned defect such as a minute flaw or bump actually exists or there is a possibility of the bump or the like existing. In this embodiment, as an example, the adjacent sectors are each set in front of and behind the borders of a sector in which a defect exists in the direction of sector arrangement, in other words, the adjacent sectors are set on each of the upstream side and downstream side in the rotational direction of the disk 10. Accordingly, in the Plist, the number of sectors (margin sector number) to be set in front of and behind the sector in which a defect exists is registered. That is, the recording surface of the disk 10 can include an area (first area, hereinafter referred to as a track skip area) corresponding to the defect. The track skip area is an area including a track having a sector in which a defect exists, and track adjacent to the aforementioned track, and is excluded from the recording area by allocating no logical addresses to the sectors of the aforementioned area. An information item about the track included in the track skip area such as a track number or the like is stored in the nonvolatile memory 90 as one item of the Plist, i.e., as one of defect information items. On the recording surface of the disk 10, to sectors of the area (second area, hereinafter referred to as a normal recording area) other than the track skip area, logical addresses are uniquely allocated, and the area is used as a recording area of the disk 10.

Further, in the nonvolatile memory 90, management information of the disk 10 is stored. When a plurality of disks 10 exists, the management information is stored in each of the disks 10. The management information of the disk 10 is, for example, a logical block addressing (LBA) starting sector position, sector number, seek sector number, skew value, and the like. The LBA starting sector position is a position (for example, a physical address) of a sector to which a top address of the logical addresses is allocated on the disk 10. The sector number is the number of sectors per one track. The seek sector number is the number of sectors to be set according to the time required by the head 15 to carry out seeks to the tracks of the number included in the track skip area. For example, the seek sector number is listed (tabulated) in association with the number of tracks (track skip width) included in the track skip area. The seek sector number is read from the aforementioned list at the time of execution of the LBA allocation processing to be described later as a parameter. The skew value is a value of a skew angle of the head relative to the track, and is a sector number corresponding to a shift of the LBA starting position (or ending position) on the adjacent track.

The system controller (controller) 100 is realized by using, for example, a large-scale integrated circuit (LSI) called a System-on-a-Chip (SoC) formed by integrating a plurality of elements into a single chip. The system controller 100 includes a read/write (R/W) channel 40, hard disk controller (HDC) 50, and microprocessor (MPU) 60. The system controller 100 is electrically connected to the driver IC 20, head amplifier IC 30, volatile memory 70, buffer memory 80, nonvolatile memory 90, and host 200.

The R/W channel 40 executes signal processing of read data to be transferred from the disk 10 to the host 200 and write data to be transferred from the host 200 according to an instruction from the MPU 60 to be described later. The R/W channel 40 includes a circuit or function configured to measure the signal quality of write data. The R/W channel 40 is electrically connected to, for example, the head amplifier IC 30, HDC 50, MPU 60, and the like.

The HDC 50 controls data transfer between the host 200 and R/W channel 40 according to an instruction from the MPU 60 to be described later. The HDC 50 is electrically connected to, for example, the R/W channel 40, MPU 60, volatile memory 70, buffer memory 80, nonvolatile memory 90, and the like.

The MPU 60 is a main controller configured to control each portion of the magnetic disk device 1. The MPU 60 controls the VCM 14 through the driver IC 20 to thereby execute servo control of carrying out positioning (seek) of the head 15. The MPU 60 controls an operation of write of data to the disk 10 and selects a storage destination of the write data. Further, the MPU 60 controls an operation of read of data from the disk 10 and controls processing of the read data. The MPU 60 is connected to each portion of the magnetic disk device 1. The MPU 60 is electrically connected to, for example, the driver IC 20, R/W channel 40, HDC 50, nonvolatile memory 90, and the like.

The MPU 60 includes a read/write control portion 61 and management portion 62. The MPU 60 executes, for example, processing of the read/write control portion 61 and management portion 62 on the firmware. It should be noted that the MPU 60 may include the read/write control portion 61 and management portion 62 as circuits.

The read/write control portion 61 controls read processing and write processing of data according to an instruction from the host 200. The read/write control portion 61 controls the VCM 14 through the driver IC 20 to thereby carry out positioning (seek) of the head 15 to a target position on the disk 10 and carry out read or write of data.

The management portion 62 divides the recording area of the disk 10 into the normal recording area and track skip area to thereby manage the recording surface. Further, the management portion 62 carries out processing (hereinafter referred to as LBA allocation processing) of allocating logical addresses to the disk 10. The LBA allocation processing is processing of allocating logical addresses to the disk 10 according to the Plist, i.e., according to presence/absence of a defect on the surface (recording surface) of the disk 10. The management portion 62 detects presence/absence of a defect in, for example, the quality inspection of the disk 10 before shipment of the product (magnetic disk device 1), and saves the Plist in the nonvolatile memory 90. In the LBA allocation processing, the management portion 62 does not allocate logical addresses to the track skip area according to the contents stored in the Plist and allocates the logical addresses to the normal recording area. Thereby, the management portion 62 excludes the track skip area from the recording area of the disk 10. As will be described later, the management portion 62 makes, according to the predetermined recording area, in this embodiment, according to the number of defects existing in the predetermined recording area, allocations of the logical addresses to the sectors of the normal recording area different from each other.

Figure 2:
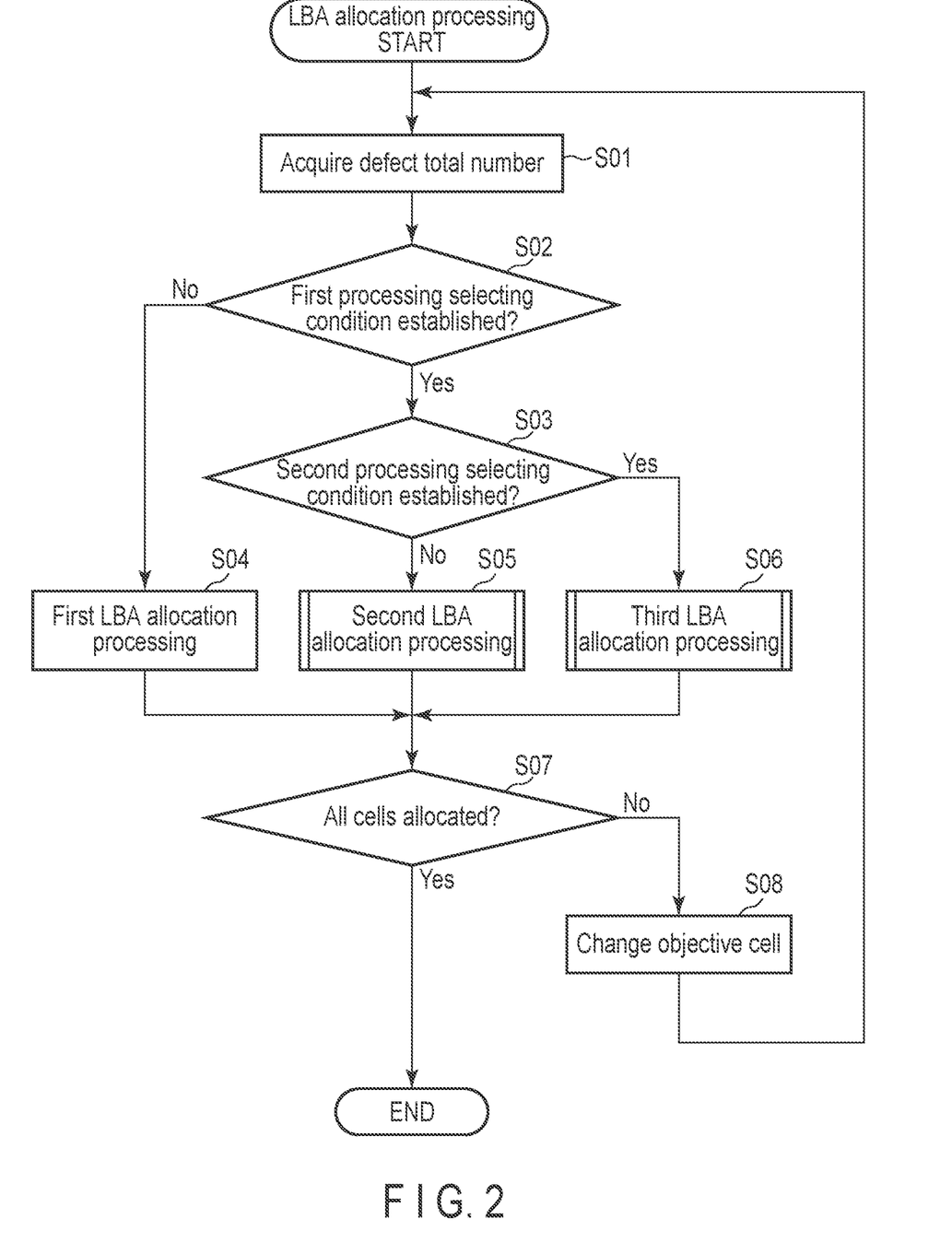
FIG. 2 is a flowchart of control to be executed by a management portion when LBA allocation processing is carried out in the magnetic disk device according to the embodiment.

Hereinafter, control to be executed by the system controller 100, more specifically, by the management portion 62 of the MPU 60 when the LBA allocation processing is carried out in the magnetic disk device 1 will be described according to the flowchart. FIG. 2 is a flowchart of control to be executed by the management portion 62 when the LBA allocation processing is carried out.

As shown in FIG. 2, in carrying out the LBA allocation processing, the management portion 62 acquires the total number (hereinafter referred to as the defect total number) of defects such as bumps and the like in the predetermined recording area (S01). In this embodiment, as an example, the predetermined recording area is an area of cell units. The cell is an area including a plurality of cylinders adjacent to each other. Accordingly, the cell is an area corresponding to the tracks of all the disks 10 corresponding to the plurality of cylinders, in other words, an area corresponding to the tracks from/to which read/write is carried out by all the heads 15. However, the predetermined recording area is not limited to such an area of cell units and may be an arbitrary area. That is, as will be described later, the management portion 62 allocates logical addresses to each cell and, in each cell, allocates logical addresses in sequence to areas in which tracks of the cell are accessed by each of the plurality of heads 15.

The management portion 62 reads a location of a defect from the Plist stored in the nonvolatile memory 90 as defect information, and integrates the numbers of defects of all the disks 10 in the cells (hereinafter referred to as objective cells) which are the objects of the LBA allocation processing. The management portion 62 retains the integrated number of defects as the defect total number in the objective cells.

The management portion 62 carries out the predetermined LBA allocation processing for the sectors of the objective cells according to the defect total number. In this embodiment, the management portion 62 carries out three different types of LBA allocation processing, i.e., the management portion 62 carries out one of first to third LBA allocation processing for the objective cells. These types of LBA allocation processing are executed by classifying the types of LBA allocation processing into the following cases by using, for example, two thresholds. The first LBA allocation processing is first allocation processing for allocation of logical addresses, and is executed for the objective cell the defect total number of which is less than a first threshold. The second LBA allocation processing is second allocation processing for allocation of logical addresses, and is executed for the objective cell the defect total number of which is greater than or equal to the first threshold and is less than a second threshold. The third LBA allocation processing is third allocation processing for allocation of logical addresses, and is executed for the objective cell the defect total number of which is greater than or equal to the second threshold.

Each of the first threshold and second threshold is a threshold used to determine which of the first to third LBA processing should be executed for the objective cell according to the defect total number. Hereinafter, the condition at the time of the aforementioned determination is called a processing selecting condition. Each of the first threshold and second threshold is stored in, for example, the nonvolatile memory 90 and is read as a parameter at the time of determination of the processing selecting condition. Although these thresholds can arbitrarily be set, the second threshold is set at a value greater than the first threshold. In this embodiment, as an example, the first threshold is set at 1, and second threshold is set at 2.

As the processing selecting conditions, the management portion 62 determines each of a first processing selection condition for comparison of the defect total number with the first threshold, and second processing selecting condition for comparison of the defect total number with the second threshold. For example, the management portion 62 compares the defect total number with the first threshold and, when the defect total number is greater than or equal to the first threshold, determines that the first processing selecting condition is established and, when the defect total number is less than the first threshold, determines that the first processing selecting condition is not established (S02). Further, the management portion 62 compares the defect total number with the second threshold and, when the defect total number is greater than or equal to the second threshold, determines that the second processing selecting condition is established and, when the defect total number is less than the second threshold, determines that the second processing selecting condition is not established (S03). In this embodiment, the management portion 62 determines the first processing selecting condition and, when the first processing selecting condition is established, determines the second processing selecting condition. However, the management portion 62 may determine the second processing selecting condition and, when the second processing selecting condition is not established, the management portion 62 may determine the first processing selecting condition.

When the first processing selecting condition is not established (No in S02), i.e., when the defect total number in the objective cell is less than the first threshold, the management portion 62 executes the first LBA allocation processing (S04). In this case, the defect total number in the objective cell is zero, and no defect exists in the objective cell. Accordingly, the management portion 62 carries out allocation of logical addresses in such a manner that all the heads 15 make sequential access, in the objective cell, to the sectors of the objective cell. At this time, on the adjacent track, the management portion 62 shifts the LBA starting sector position by an amount of distance corresponding to the skew value. Thereby, it becomes possible to make access to the adjacent track without a rotational delay.

When the first processing selecting condition is established (Yes in S02), i.e., when the defect total number in the objective cell is greater than or equal to the first threshold, the management portion 62 determines the second processing selecting condition (S03).

When the second processing selecting condition is not established (No in S03), the management portion 62 executes the second LBA allocation processing (S05). This case corresponds to the case where the defect total number in the objective cell is greater than or equal to the first threshold and is less than the second threshold, i.e., the case where the defect total number in the objective cell is 1. The second LBA allocation processing will be described later.

When the second processing selecting condition is established (Yes in S03), the management portion 62 executes the third LBA allocation processing (S06). This case corresponds to the case where the defect total number in the objective cell is greater than or equal to the second threshold, i.e., the case where the defect total number in the objective cell is greater than or equal to 2. The third LBA allocation processing will be described later.

The management portion 62 repeats the processing from S01 to S06 according to the defect total number in the objective cell until logical addresses are allocated to the normal recording areas in all the cells other than the track skip area (S07). Accordingly, when a cell to which no logical addresses are allocated exists (No in S07), the management portion 62 changes the next cell, for example, the cell adjacent to the current objective cell to the new objective cell (S08), and acquires the defect total number in the new objective cell (S01). Thereafter, the management portion 62 carries out one of the first to third LBA allocation processing (S04, S05, S06) according to the acquired defect total number and allocates logical addresses to the new objective cell. On the other hand, when logical addresses are allocated to all the cells and no cell to which no logical address is allocated exists (Yes in S07), the management portion 62 terminates the LBA allocation processing.

Figure 3:
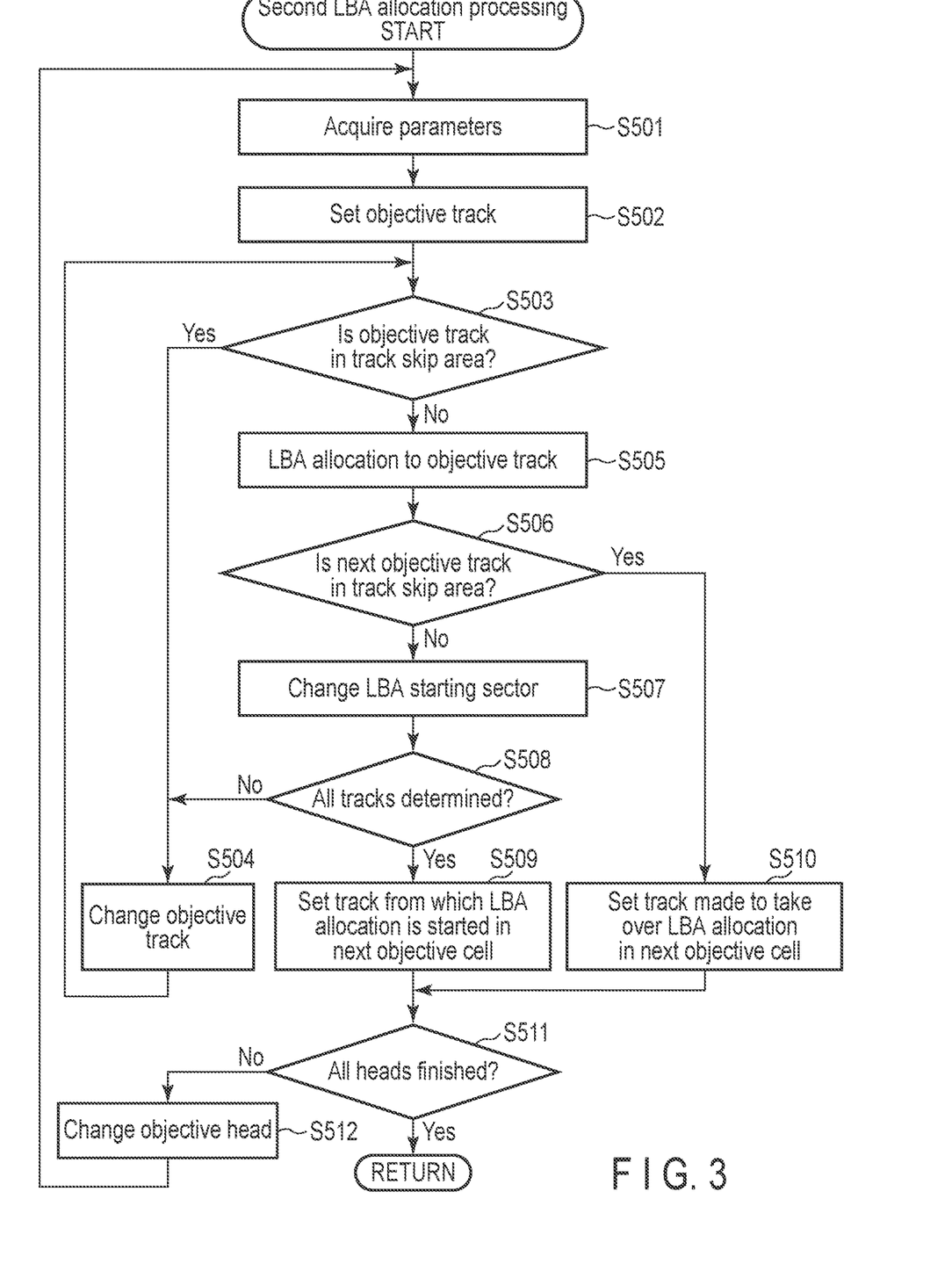
FIG. 3 is a flowchart of control to be executed by the management portion when second LBA allocation processing is carried out in the magnetic disk device according to the embodiment.
Figure 4:
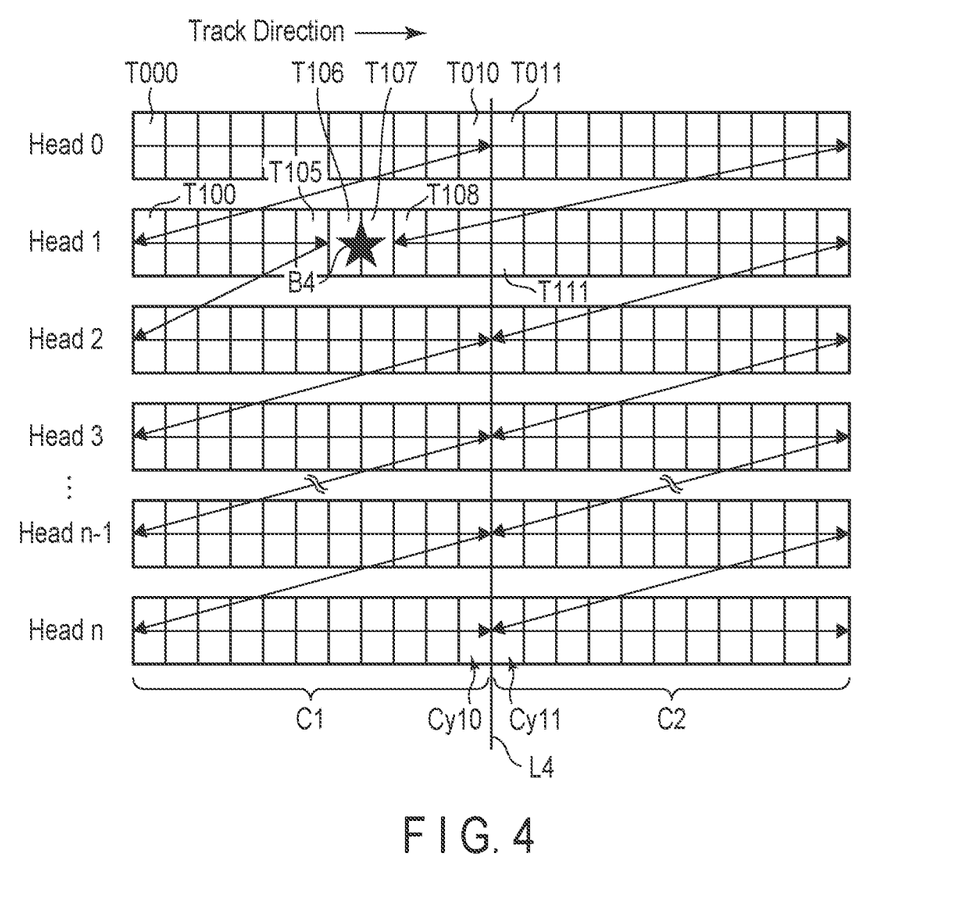
FIG. 4 is a view schematically showing an aspect of allocation of logical addresses by the second LBA allocation processing in the magnetic disk device according to the embodiment.

Next, the second LBA allocation processing (S05) will be described. The second LBA allocation processing is processing of carrying out read/write of data from/to the tracks ranging up to the track positioned on this side of the track skip area and thereafter carrying out allocation of logical addresses in such a manner that the head 15 is changed to another head 15 and read/write of data is carried out by the new head 15. FIG. 3 is a flowchart of control to be executed by the management portion 62 when the second LBA allocation processing is carried out. FIG. 4 is a view schematically showing allocation of logical addresses by the second LBA allocation processing. In FIG. 4, the lateral direction is the track arrangement direction and longitudinal direction is the head (disk) arrangement direction. In this case, the left side in the lateral direction corresponds to the outer side of the disk in the radial direction thereof, and right side corresponds to the inner side of the disk in the radial direction thereof.

In the example shown in FIG. 4, a plurality of objective heads exists from the logical head number 0 (zero) to n. In FIG. 4, one square longitudinally and laterally defined and corresponding to each logical head indicates an area (mass) constituted of a plurality of tracks. Further, the cell is separated into the cell C1 and cell C2 at a position between an aggregate area Cy10 and aggregate area Cy11 each of which is the mass of the tracks and corresponds to each of all the logical heads. A solid line L4 is the borderline between the cell C1 and cell C2. A star mark B4 indicates a bump which is a defect. That is, one bump B4 exists in the cell C1, more specifically, on the tracks (T106, T107) of the cell C1 accessed by the head (Head 1) a logical head number of which is 1. Accordingly, with respect to the cell C1, the second LBA allocation processing is carried out. Further, the tracks T106 and T107 are made the track skip area. On the other hand, in the cell C2, no defect such as a bump or the like exists and no track skip area exists. Accordingly, with respect to the cell C2, the first LBA allocation processing is carried out.

As shown in FIG. 3, in carrying out the second LBA allocation processing, the management portion 62 acquires the predetermined parameters (S501). The management portion 62 reads the LBA starting sector position, sector number, skew value, and seek sector number from the management information of the disk 10 stored in, for example, the nonvolatile memory 90 and retains these values as the parameters. Here, the disk 10 regarding which the parameters are acquired is the predetermined disk 10 in which logical addresses are allocated in the objective cell. For example, the aforementioned disk 10 is the disk 10 from/to which data is read/written by the head 15 having the top logical head number. Hereinafter, the head 15 configured to carry out read/write of data from/to the aforementioned predetermined disk 10 is referred to as the objective head. The objective heads are set in sequence in the order from, for example, the top of the logical head numbers.

Further, the management portion 62 sets the track (hereinafter referred to as the objective track) from which allocation of logical addresses is to be started (S502). The objective track is the track from/to which data is read/written by the objective head. In this embodiment, as an example, the management portion 62 makes the minimum track of the objective cell the objective track. The minimum track is the track positioned on the outermost side of the disk 10 in the radial direction thereof among the tracks included in the objective cell. However, the minimum track is an example of the objective track and the objective track is not limited to the minimum track. For example, the objective track may be the maximum track of the objective cell, i.e., the track positioned on the innermost side of the disk 10 in the radial direction thereof among the tracks included in the objective cell.

Subsequently, the management portion 62 determines whether or not the objective track is included in the track skip area (S503). In carrying out the determination, the management portion 62 reads the Plist (defect information)

stored in, for example, the nonvolatile memory 90 and determines whether or not the objective track corresponds to a track of the track skip area by collation using track numbers or the like. For example, the tracks T106 and T107 shown in FIG. 4 correspond to those of the track skip area.

When the objective track is included in the track skip area (Yes in S503), the management portion 62 changes the next track, for example, a track adjacent to the current objective track on the inner side thereof in the radial direction of the disk 10 to a new objective track (S504), and determines whether or not the new objective track is included in the track skip area (S503). In this case, the objective track is included in the track skip area, and hence the management portion 62 does not allocate any logical address to the objective track and excludes the objective track from the recording area of the disk 10. For example, the tracks T106 and T107 shown in FIG. 4 are included in the track skip area, and hence no logical addresses are allocated to these tracks.

On the other hand, when the objective track is not included in the track skip area (No in S503), the management portion 62 allocates logical addresses to the sectors of the objective track (S505: LBA allocation). At this time, the management portion 62 uniquely (for example, in ascending order) allocates logical addresses from the sector corresponding to the LBA starting sector position of the objective track. For example, the tracks 1000 to 1010, and tracks T100 to T105 are not included in the track skip area, and hence logical addresses are allocated to these tracks.

Then, the management portion 62 determines whether or not the track next to the objective track (hereinafter referred to as a next objective track), e.g., a track adjacent to the objective track concerned on the inner side thereof in the radial direction of the disk 10 is included in the track skip area (S506). The next objective track is a track from/to which data is read/written by the objective head, and is a track which becomes the object of logical address allocation subsequently to the objective track. In carrying out the determination, the management portion 62 reads the Plist stored in, for example, the nonvolatile memory 90 and determines whether or not the next objective track corresponds to a track of the track skip area by collation using track numbers or the like.

When the next objective track is not included in the track skip area (No in S506), the management portion 62 changes the LBA starting sector (S507). For example, when the next objective track is the track T105 shown in FIG. 4, it is determined in step S506 that the next objective track is not included in the track skip area (No in S506). In this case, the management portion 62 shifts the LBA starting sector position according to the skew value to thereby change the LBA starting sector position. For example, the management portion 62 calculates a remainder to be acquired after dividing a value obtained by adding the skew value to the LBA starting sector position by the sector number. Then, the management portion 62 shifts the LBA starting sector position by an amount of distance corresponding to the calculated remainder and retains the value of the resultant position as the LBA starting sector position of the next objective track. The skew value and sector number are retained as parameters read from the management information of the disk 10 (S501).

The management portion 62 selectively repeats the processing from S503 to S507 according to whether or not the objective track is included in the track skip area until determination whether or not logical address allocation is necessary is made as to all the tracks of the objective cell (S508). Accordingly, when a track regarding which the determination whether or not logical address allocation is necessary has not been made exists (No in S508), the management portion 62 makes, for example, a track adjacent to the current objective track on the inner side thereof in the radial direction of the disk 10 a new objective track (S504), and determines whether or not the new objective track is included in the track skip area (S503). Thereafter, the management portion 62 allocates a logical address to the new objective track according to success/failure of such determination.

On the other hand, when determination whether or not logical address allocation is necessary has been made as to all the tracks and no track regarding which the aforementioned determination has not been made exists (Yes in S508), a track from which allocation of logical addresses is to be started is set in the next objective cell (S509). The next objective cell is a cell next to the objective cell and is, for example, a cell adjacent to the current objective cell on the inner side thereof in the radial direction of the disk 10. In this case, the management portion 62 sets a track next to the current objective track, e.g., a track adjacent to the current objective track on the inner side thereof in the radial direction of the disk 10 as the track from which allocation of logical addresses is to be started in the next objective cell. That is, a track having a track number obtained by adding 1 to the track number of the current objective track is set as the track from which allocation of logical addresses is to be started in the next objective cell. Thereby, the track (new objective track) from which allocation of logical addresses is to be started in the next objective cell to be accessed by the objective head is the aforementioned track set as described above. As an example, when, in FIG. 4, the objective head is the head 0 and objective cell is the cell C1, the next objective cell is the cell C2. When the current objective track in the objective cell (cell C1) is the track T010, the track from which allocation of logical addresses is to be started in the next objective cell (cell C2) is the track T011.

Further, when the next objective track is included in the track skip area (Yes in S506), the management portion 62 sets another track (objective track) from which allocation of logical addresses is to be started in the next objective cell (S510). For example, when the next objective track is the track T106 shown in FIG. 4, it is determined in S506 that the next objective track is included in the track skip area (Yes in S506).

In setting the objective track of the next objective cell, the management portion 62 acquires a track skip width corresponding to the seek sector number (S501) retained as the parameter. The track skip width is listed (tabulated) in association with, for example, the seek sector number and is stored in the nonvolatile memory 90. The management portion 62 reads the list by using the seek sector number as a key and retains the value of the track skip width associated with the seek sector number. The management portion 62 sets a track having a track number of a value acquired by adding 1 to a value obtained by adding the track skip width to the track number of the objective track as the objective track of the next objective cell. The management portion 62 retains, for example, the track number of the set objective track of the next objective cell. Thereby, the track (new objective track) from which allocation of logical addresses is to be started in the next objective cell to be accessed by the objective head is the aforementioned track set as described above. Accordingly, when logical addresses are allocated to the next objective cell, allocation of logical addresses is resumed from the set new objective track, and allocation of logical addresses is taken over by the minimum track of the next objective cell. As an example, when, in FIG. 4, the objective head is the head 1 and objective cell is the cell C1, logical addresses are allocated to the tracks from the minimum track T100 of the objective cell C1 to the track T105 just on this side of the track skip area. Thereafter, when logical addresses are allocated to the cell C2 which is the next objective cell, allocation of logical addresses is resumed from the track T108 and allocation of logical addresses is taken over by the track T111 which is the minimum track.

The management portion 62 selectively repeats the processing from S501 to S510 until determination whether or not logical address allocation is necessary is made as to all the disks 10 of the objective cell (S511). Accordingly, when a disk 10 (in other words, head 15) regarding which the determination whether or not logical address allocation is necessary has not been made exists (No in S511), the management portion 62 changes the next head 15 of the objective head, e.g., the head 15 having a logical head number subsequent to the current objective head to the new objective head (S512). As an example, when, in FIG. 4, the objective head is the head 0 (head 0 having the logical head number 0) and objective cell is the cell C1, after logical addresses are allocated up to the track T010 of the objective cell C1, the objective head is changed to the head 1 (head 1 having the logical head number 1). Then, when the objective head is the head 1 and objective cell is the cell C1, after logical addresses are allocated up to the track T105 (track on this side of the track skip area) of the objective cell C1, the objective head is changed to the head 2 (head 2 having the logical head number 2).

Then, the management portion 62 acquires predetermined parameters with respect to the disk 10 corresponding to the new objective head (S501). The management portion 62 reads the LBA starting sector position, sector number, and skew value from the management information of the disk 10 stored in, for example, the nonvolatile memory 90 and retains the read values as the parameters. Thereafter, the management portion 62 uses the acquired parameters to thereby allocate logical addresses to the disk 10 corresponding to the new objective head.

On the other hand, when the parameters are acquired with respect to the disks 10 corresponding to all the heads 15 and no head regarding which no parameters are acquired exists (Yes in S511), the managing portion 62 terminates the second LBA allocation processing. Upon termination of the second LBA allocation processing, the management portion 62 returns to aforementioned processing step S07 (FIG. 2) to determine whether or not logical addresses have been allocated to all the cells.

Figure 5:
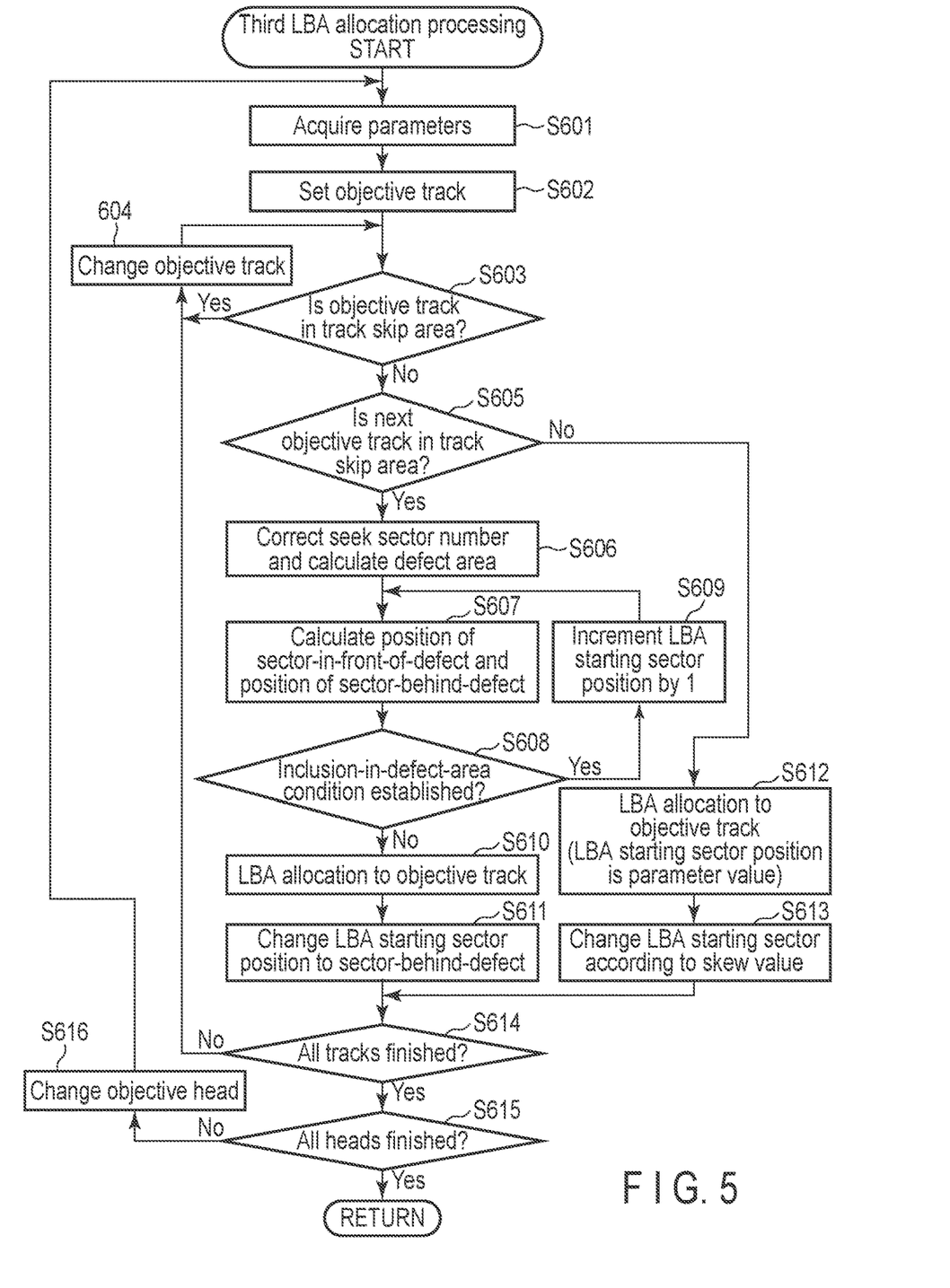
FIG. 5 is a flowchart of control to be executed by the management portion when third LBA allocation processing is carried out in the magnetic disk device according to the embodiment.

Subsequently, the third LBA allocation processing (S06) will be described. The third LBA allocation processing is processing of changing the position of the sector from which allocation of logical addresses is to be started according to the position of the defect to thereby carry out allocation of logical addresses. FIG. 5 is a flowchart of control to be executed by the management portion 62 when the third LBA allocation processing is carried out. It should be noted that part of processing steps in the third LBA allocation processing include the contents identical to or similar to processing steps of the second LBA allocation processing. For this reason, in the descriptions of the contents identical to or similar to the second LBA allocation processing, the descriptions given above are appropriately applied.

Figure 6:
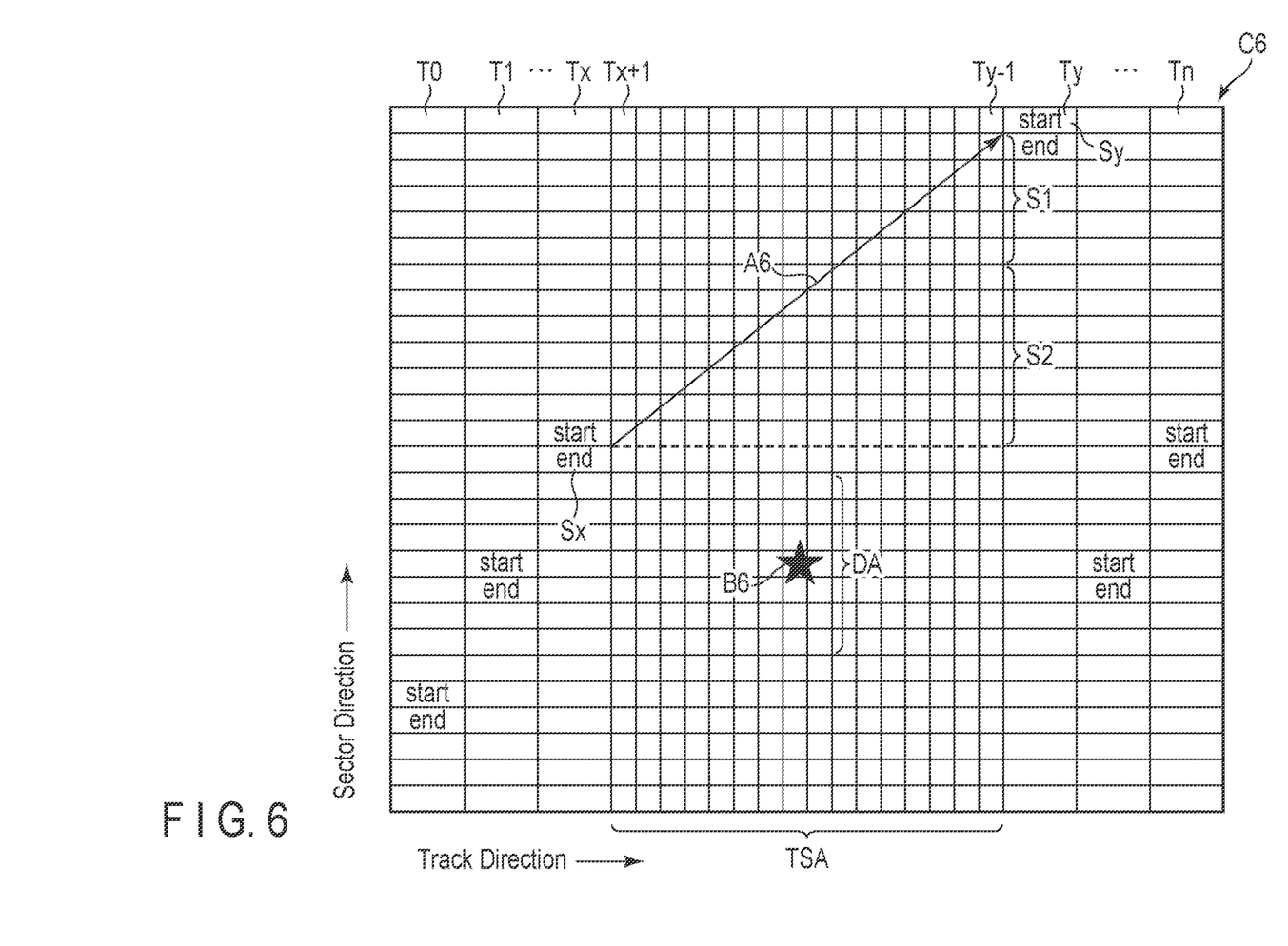
FIG. 6 is a view schematically showing an aspect of allocation of logical addresses by the third LBA allocation processing in the magnetic disk device according to the embodiment.

FIG. 6 is a view schematically showing an aspect of allocation of logical addresses by the third LBA allocation processing. FIG. 6 shows an area of n tracks (T0 to Tn) included in the predetermined cell C6 in which the third LBA allocation processing is carried out. In FIG. 6, the lateral direction is the track arrangement direction, longitudinal direction is the sector arrangement direction, and one square longitudinally and laterally defined is an area corresponding to one sector of one track. In this case, the left side in the lateral direction corresponds to the outer side of the disk in the radial direction thereof, and right side corresponds to the inner side of the disk in the radial direction thereof. Further, in the longitudinal direction, the direction from the lower side to the upper side corresponds to the rotational direction of the disk. The notation 'start' indicates a sector to which the top logical address in each track is allocated, and 'end' indicates a sector to which the tail-end logical address in each track is allocated. The star mark B6 indicates a bump which is a defect. Accordingly, the area TSA (area between track Tx+1 and track Ty−1) of the cell C6 is made the track skip area.

As shown in FIG. 5, in carrying out the third LBA allocation processing, the management portion 62 acquires the predetermined parameters (S601). The management portion 62 reads the LBA starting sector position, sector number, skew value, seek sector number, and margin sector number from the management information of the disk 10 stored in, for example, the nonvolatile memory 90 and retains these values as the parameters. Here, the disk 10 regarding which the parameters are acquired is the predetermined disk 10 to which logical addresses are to be allocated, and head 15 configured to read/write data from/to the disk 10 concerned is the objective head. The objective heads are set in sequence from, for example, the top of the logical head numbers.

Further, the management portion 62 sets the track (objective track) from which allocation of logical addresses is to be started (S602). The objective tack is the track from/to which data is read/written by the objective head, and is the minimum track of the objective cell. However, the minimum track is an example of the objective track, and the objective track may be, for example, the maximum track in place of the minimum track.

Subsequently, the management portion 62 determines whether or not the objective track is included in the track skip area (S603). In carrying out the determination, the management portion 62 reads the Plist (defect information) stored in, for example, the nonvolatile memory 90, and determines whether or not the objective track corresponds to a track of the track skip area by collation using track numbers or the like.

When the objective track is included in the track skip area (Yes in S603), the management portion 62 makes the next track, e.g., a track adjacent to the current objective track on the inner side thereof in the radial direction of the disk 10 the new objective track (S604), and determines whether or not the new objective track is included in the track skip area (S603). In this case, the objective track is included in the track skip area, and hence the management portion 62 does not allocate logical addresses to the objective track to thereby exclude the objective track from the recording area of the disk 10. For example, the tracks from Tx+1 to Ty−1 shown in FIG. 6 are included in the track skip area, and hence no logical addresses are allocated to these tracks.

On the other hand, when the objective track is not included in the track skip area (No in S603), the management portion 62 determines whether or not the next objective track is included in the track skip area (S605). In carrying out the determination, the management portion 62 reads the Plist stored in, for example, the nonvolatile memory and determines whether or not the next objective track corresponds to a track of the track skip area by collation using track numbers or the like. For example, the tracks T1 to Tx, and tracks Ty to Tn all of which are shown in FIG. 6 are not included in the track skip area, and hence logical addresses are allocated to these tracks.

When the next objective track is included in the track skip area (Yes in step S605), the management portion 62 corrects the seek sector number and calculates the defect area (S606). For example, when the next objective track is the track Tx+1 shown in FIG. 6, it is determined in S605 that the next objective track is included in the track skip area (Yes in in S605). In correcting the seek sector number, the management portion 62 calculates a value obtained by adding the seek sector number to the skew value, and retains the calculated value as the seek sector number after the correction. The skew value and seek sector number before the correction are retained as the parameters read from the management information of the disk 10 (S601). As an example, the skew value is the sector number of the sector area S1 shown in FIG. 6. Further, as an example, the seek sector number is the sector number of the sector area S2 shown in FIG. 6. The defect area is an area including a sector in which a defect exists and sectors of a margin sector number adjacent to the aforementioned sector and is, as an example, the area DA shown in FIG. 6. The management portion 62 reads the Plist stored in, for example, the nonvolatile memory 90 to thereby acquire the position of the sector in which a defect exists. The management portion 62 calculates the defect area on the basis of the acquired sector position, sector number, and margin sector number. For example, the management portion 62 calculates a remainder to be acquired after dividing a value obtained by adding the margin sector number to the sector position by the sector number. Then, the management portion 62 retains an area obtained by adding sectors of the number corresponding to the calculated remainder to the front and rear of the position of the sector in which the defect exists as the defect area. The sector number and margin sector number are retained as the parameters read from the management information of the disk 10 (S601).

Subsequently, the management portion 62 calculates each of a position of a sector-in-front-of-defect and position of a sector-behind-defect (S607). The sector-in-front-of-defect is the sector to which the tail-end logical address is allocated on the track on this side of the track skip area, i.e., on the objective track. The sector-behind-defect is the sector to which the top logical address is allocated on the track (corresponding to the next objective track) adjacent to the track skip area on the opposite side of the objective track with the track skip area interposed between the aforementioned track and objective tack, e.g., on the inner side of the track skip area in the radial direction of the disk 10. The management portion 62 calculates a remainder to be acquired after dividing a value obtained by subtracting 1 from the LBA starting sector position by the sector number and retains the value of the calculated remainder as the position of the sector-in-front-of-defect. The LBA starting sector position and sector number are retained as the parameters read from the management information of the disk 10 (S601). Furthermore, the management portion 62 calculates a remainder to be acquired after dividing a value obtained by adding the seek sector number to the position of the sector-in-front-of-defect by the sector number and retains the value of the calculated remainder as the position of the sector-behind-defect. The seek sector number is retained in step S606 as the seek sector number after the correction.

Subsequently, the management portion 62 carries out determination about the inclusion-in-defect-area condition with respect to the sector-in-front-of-defect and sector-behind-defect (S608). The inclusion-in-defect-area condition is the condition for determining whether or not each of the sector-in-front-of-defect and sector-behind-defect exists in the defect area. Here, when at least one of the sector-in-front-of-defect and sector-behind-defect is positioned inside the defect area, the management portion 62 determines that the inclusion-in-defect-area condition is established. Conversely, when both the sector-in-front-of-defect and sector-behind-defect are not positioned inside the defect area, the management portion 62 determines that the inclusion-in-defect-area condition is not established.

When the inclusion-in-defect-area condition is established (Yes in S608), the management portion 62 increments the LBA starting sector position by one (S609), and recalculates each of the position of the sector-in-front-of-defect and position of the sector-behind-defect (S607). Incrementing the LBA starting sector position by one corresponds to increasing the physical address correspondent to the LBA starting sector position by one. Then, the management portion 62 re-determines the inclusion-in-defect-area condition (S608). That is, the management portion 62 repetitively carries out incrementing of the LBA starting sector position (S609), calculation of the sector-in-front-of-defect position and sector-behind-defect position (S607), and determination of the inclusion-in-defect-area condition (S608) until the inclusion-in-defect-area condition comes not to be established.

Conversely, when the inclusion-in-defect-area condition is not established (No in S608), i.e., when both the sector-in-front-of-defect and sector-behind-defect are not positioned inside the defect area, the management portion 62 allocates logical addresses to the sectors of the objective track (S610: LBA allocation). For example, the sector Sx of the track Tx shown in FIG. 6 corresponds to the sector-in-front-of-defect and sector Sy of the track Ty corresponds to the sector-behind-defect. At this time, the management portion 62 uniquely (for example, in ascending order) allocates logical addresses from the sector corresponding to the LBA starting sector position of the objective track. The LBA starting sector position mentioned here is the value read from the management information of the disk 10 and retained as the parameter (S601) or value obtained by increasing the aforementioned parameter value by a predetermined value (S609).

Then, the management portion 62 corrects the LBA starting sector position (S611). In this case, the management portion 62 changes the LBA starting sector position to the sector-behind-defect position and retains the value of the position. Thereby, the LBA starting sector of the next objective track is changed to the sector-behind-defect. It should be noted that the next objective track mentioned here is, for example, the track adjacent to the track skip area on the opposite side of the objective track with the track skip area interposed between the aforementioned track and objective tack, e.g., on the inner side of the track skip area in the radial direction of the disk 10. For example, as shown in FIG. 6 by the arrow A6, the LBA starting sector position is changed to the position of the sector Sy of the track Ty.

Further, when the next objective track is not included in the track skip area (No in S605), the management portion 62 allocates logical addresses to the sectors of the objective track (S612). For example, when the next objective track is the track Tx shown in FIG. 6, it is determined in step S605 that the next objective track is not included in the track skip area (No in S605). At this time, the management portion 62 uniquely (for example, in ascending order) allocates logical addresses from the sector corresponding to the LBA starting sector position of the objective track. The LBA starting sector position mentioned here is the value read from the management information of the disk 10 and retained as the parameter (S601).

Subsequently, the management portion 62 changes the LBA starting sector (S613). In this case, the management portion 62 shifts the LBA starting sector position according to the skew value to thereby change the LBA starting sector position. For example, the management portion 62 calculates a remainder to be acquired after dividing a value obtained by adding the skew value to the LBA starting sector position by the sector number. Then, the management portion 62 shifts the LBA starting sector position by an amount of distance corresponding to the calculated remainder and retains the value of the resultant position as the LBA starting sector position of the next objective track. The skew value and sector number are retained as parameters read from the management information of the disk 10 (S601).

After correcting the LBA starting sector position in step S611 or S613, the management portion 62 selectively repeats the processing from S603 to S613 according to whether or not the objective track is included in the track skip area until determination whether or not logical address allocation is necessary is made as to all the tracks of the objective cell (S614). Accordingly, when a track regarding which the determination whether or not logical address allocation is necessary has not been made exists (No in S614), the management portion 62 makes a next objective track, for example, a track adjacent to the current objective track on the inner side thereof in the radial direction of the disk 10 a new objective track (S604), and determines whether or not the new objective track is included in the track skip area (S603). Thereafter, the management portion 62 allocates logical addresses to the new objective track according to success/failure of such determination.

On the other hand, when determination whether or not logical address allocation is necessary has been made as to all the tracks and no track regarding which the aforementioned determination has not been made exists (Yes in S614), the management portion 62 selectively repeats the processing from step S601 to S614 until logical addresses are allocated to all the disks 10 of the objective cell (S615). Accordingly, when a disk 10 (in other words, head 15) regarding which the determination whether or not logical address allocation is necessary has not been made exists (No in S615), the management portion 62 makes the next head 15 of the objective head, e.g., a head 15 having a logical head number subsequent to the current object head a new objective head (S616). Then, the management portion 62 acquires predetermined parameters relating to the disk 10 corresponding to the new objective head (S601). The management portion 62 reads the LBA starting sector position, sector number, skew value, seek sector number, and margin sector number from the management information of the disk 10 stored in, for example, the nonvolatile memory 90 and retains these values as the parameters. Thereafter, the management portion 62 uses the acquired parameters to thereby allocate logical addresses to the disk 10 corresponding to the new objective head.

On the other hand, when parameters are acquired with respect to the disks 10 corresponding to all the heads 15, and no head 15 regarding which no parameters are acquired exists (Yes in S615), the management portion 62 terminates the third LBA allocation processing. Upon termination of the third LBA allocation processing, the management portion 62 returns to aforementioned processing step S07 (FIG. 2) to determine whether or not logical addresses have been allocated to all the cells.

As shown in FIG. 2, FIG. 3, and FIG. 5, the management portion 62 selectively executes the first LBA allocation processing, second LBA allocation processing, and third LBA allocation processing according to success/failure of the processing selecting conditions (first processing selecting condition and second processing selecting condition) and allocates logical addresses to the normal recording area other than the track skip area in all the cells. Thereby, a series of control for the LBA allocation processing is terminated.

As described above, according to the magnetic disk device 1 according to the embodiment, even when defects such as a bump and the like exist on the disk, it is possible to allocate logical addresses without the need to straddle the bump or the like. Thereby, it is possible to avoid a collision with the defect such as a bump or the like and suppress deterioration in the sequential performance at the time of read and at the time of write of data. Further, even in the case of, for example, random access including a data length having the need to straddle a bump at the time of write to be carried out once, it becomes possible to make access while avoiding a bump, and hence it is possible to suppress deterioration in the write performance.

More specifically, in carrying out logical address allocation, it is possible to selectively carry out the first LBA allocation processing, second LBA allocation processing, and third LBA allocation processing according to the defect total number of each cell. For example, when the defect total number is less than the first threshold, as an example, when the defect total number is 0 (zero), the first LBA allocation processing is carried out. Thereby, logical addresses are allocated in such a manner that all the heads 15 make sequential access to the sectors in the objective cell. At this time, the LBA starting sector position is shifted by an amount of distance corresponding to the skew value on the adjacent track, whereby it becomes possible to make access to the adjacent track without a rotational delay.

Further, for example, when the defect total number is greater than or equal to the first threshold and is less than the second threshold, as an example, when the defect total number is 1, the second LBA allocation processing is carried out. Thereby, it is possible, after allocating logical addresses up to the track on this side of the track skip area of the objective cell, to change the objective head of logical address allocation to a head next to the current head. That is, it is possible to allocate logical addresses in such a manner as to change the head just on this side of the track skip area. Accordingly, it is possible to make access to the disk 10 without straddling a bump or the like.

Further, for example, when the defect total number is greater than or equal to the second threshold, as an example, when the defect total number is 2 or more, the third LBA allocation processing is carried out. More specifically, a defect area including the sector in which a defect exists, and sectors of the margin sector number adjacent to the aforementioned sector is set. When both the sector-in-front-of-defect and sector-behind-defect are not positioned inside the defect area, logical addresses are uniquely (for example, in ascending order) allocated from the sector corresponding to the LBA starting sector position of the objective track. Then, the LBA starting sector position is changed to the sectorbehind-defect position, and logical addresses are allocated to the next objective track. Thereby, it is possible to avoid the situation in which when only the second LBA allocation processing is carried out, head change is repeated over and over again, and the write performance is deteriorated. That is, it is possible to allocate logical addresses according to the position of the defect without repeating head change.

Accordingly, it is possible to selectively execute, for each cell, such logical address allocation that head change is carried out just on this side of the track skip area, and logical address allocation to be carried out according to the position of the defect. Accordingly, according to this embodiment, it is possible to efficiently realize avoidance of collision with a defect such as a bump or the like, and suppression of deterioration in the sequential performance at the time of read/write of data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
magnetic disks;
heads each of which writes data to the magnetic disk and reads data from the magnetic disk; and
a controller which does not allocate logical addresses to sectors of a first area to be specified in such a manner as to correspond to a defect existing in a predetermined recording area, the first area being within the predetermined recording area constituted of a plurality of cylinders adjacent to each other in the magnetic disks, and uniquely allocates logical addresses to sectors of a second area other than the first area, wherein
the controller makes allocation of logical addresses to the sectors of the second area different from each other according to the number of defects existing in the predetermined recording area.

2. The magnetic disk device of claim 1, wherein
the controller executes, when the number of defects is less than a first threshold, first allocation processing of allocating logical addresses in such a manner that the head sequentially makes access, in the second area, to the sectors of the second area,
when the number of defects is greater than or equal to the first threshold and is less than a second threshold greater than the first threshold, executes second allocation processing of carrying out read/write of data from/to tracks ranging up to a track positioned on this side of the first area and thereafter allocating logical addresses in such a manner that the head is changed to another head and read/write of data is carried out by the new head, and
when the number of defect is greater than or equal to the second threshold, executes third allocation processing of changing a position of the sector from which allocation of logical addresses is to be started in the second area according to a position of the defect to thereby allocate logical addresses.

3. The magnetic disk device of claim 2, wherein
in the second allocation processing,
the controller changes, when a next objective track to which logical addresses are to be allocated next to an objective track including the sectors to which logical addresses are to be allocated is not included in first area, a position of an allocation starting sector from which allocation of logical addresses is to be started on the next objective track according to a skew value of the head relative to the next objective track, and
when the next objective track is included in the first area, sets a track to which logical addresses are to be allocated subsequently to the objective track according to the number of tracks included in the first area.

4. The magnetic disk device of claim 2, wherein
in the third allocation processing,
the controller allocates, when a next objective track to which logical addresses are to be allocated subsequently to the objective track including the sectors to which logical addresses are to be allocated is not included in the first area, logical addresses to the sectors of the objective track, and
when the next objective track is included in the first area, calculates each of a position of a sector-in-front-of-defect which is the sector to which a tail-end logical address is allocated on the objective track and a position of a sector-behind-defect which is the sector to which a top logical address is allocated on the next objective track on the basis of the skew value of the head relative to the next objective track, a seek sector number to be set according to the time required by the head to carry out seeks to tracks of a number included in the first area, and a defect area including the sector in which the defect exists and sectors of a predetermined number adjacent to the sector concerned.

5. The magnetic disk device of claim 4, wherein
the controller allocates, when both the sector-in-front-of-defect and the sector-behind-defect are not positioned in the defect area, logical addresses to the sectors of the objective track and makes the position of the allocation starting sector from which allocation of logical addresses is to be started on the next object track the position of the sector-behind-defect.

6. The magnetic disk device of claim 1, wherein
the first area is an area including the track possessing the sector in which the defect exists and a track which is adjacent to the track concerned and in which no defect exists.

7. The magnetic disk device of claim 2, wherein
the first area is an area including the track possessing the sector in which the defect exists and a track which is adjacent to the track concerned and in which no defect exists.

8. The magnetic disk device of claim 3, wherein
the first area is an area including the track possessing the sector in which the defect exists and a track which is adjacent to the track concerned and in which no defect exists.

9. The magnetic disk device of claim 4, wherein
the first area is an area including the track possessing the sector in which the defect exists and a track which is adjacent to the track concerned and in which no defect exists.

10. The magnetic disk device of claim 5, wherein
the first area is an area including the track possessing the sector in which the defect exists and a track which is adjacent to the track concerned and in which no defect exists.

11. A control method of a magnetic disk device comprising:
- dividing a predetermined recording area constituted of a plurality of cylinders adjacent to each other in magnetic disks into a first area which is specified in such a manner as to correspond to a defect existing in the predetermined recording area and to which no logical addresses are allocated, and a second area which is an area other than the first area and to which logical addresses are uniquely allocated;
- allocating, when the number of defects is less than a first threshold, logical addresses in such a manner that a head which carries out read/write of data in the second area sequentially makes access to sectors of the second area;
- carrying out, when the number of defects is greater than or equal to the first threshold and is less than a second threshold greater than the first threshold, read/write of data from/to tracks ranging up to a track positioned on this side of the first area and thereafter allocating logical addresses in such a manner that the head is changed to another head and read/write of data is carried out by the new head; and changing, when the number of defects is greater than or equal to the second threshold, a position of the sector from which allocation of logical addresses is to be started in the second area according to a position of the defect and thereby allocating logical addresses.

* * * * *